(12) United States Patent
Patil et al.

(10) Patent No.: US 11,706,110 B2
(45) Date of Patent: Jul. 18, 2023

(54) SYSTEM AND METHOD OF CLOSED LOOP ANALYTICS FOR NETWORK AUTOMATION

(71) Applicant: Verizon Patent and Licensing Inc., Arlington, VA (US)

(72) Inventors: Sudhakar Reddy Patil, Flower Mound, TX (US); Violeta Cakulev, Millburn, NJ (US); Lalit R. Kotecha, San Ramon, CA (US); Ravi Potluri, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 229 days.

(21) Appl. No.: 16/510,185

(22) Filed: Jul. 12, 2019

(65) Prior Publication Data

US 2021/0014141 A1    Jan. 14, 2021

(51) Int. Cl.
*H04L 43/065*    (2022.01)
*H04W 76/25*    (2018.01)
(Continued)

(52) U.S. Cl.
CPC ........ *H04L 43/065* (2013.01); *H04L 41/0823* (2013.01); *H04L 41/5009* (2013.01);
(Continued)

(58) Field of Classification Search
CPC . H04L 41/16; H04L 41/5009; H04L 41/5019; H04L 41/5032; H04L 41/147;
(Continued)

(56) References Cited

U.S. PATENT DOCUMENTS 10,986,579 B2 * 4/2021 Han ..................... H04W 24/02
2018/0287920 A1 * 10/2018 Sanganabhatla ...... H04L 67/303
(Continued)

FOREIGN PATENT DOCUMENTS

WO    WO-2020098951 A1 *  5/2020  ........... H04L 41/142
WO    WO-2020207607 A1 * 10/2020  ............. H04L 67/14

OTHER PUBLICATIONS

Barmpounakis et al., "Data Analytics for 5G Networks: A Complete Framework for Network Access Selection and Traffic Steering", International Journal on Advances in Telecommunications, vol. 11 No. 3 & 4, 2018, http://www.iariajournals.org/telecommunications/, p. 101-114. (Year: 2018).*

(Continued)

*Primary Examiner* — Gregory Todd

(57) ABSTRACT

Systems and methods implement closed loop analytics feedback for a transport network. A network device, such as a Network Data Analytics Function (NWDAF), receives, from a commissioning network function, an analytic information request for analytic event information and sends, to the commissioning network function, an analytic report that is responsive to the analytic information request wherein the analytic report includes a unique analytic report identifier. The network device receives, from the commissioning network function, a feedback event message that includes the analytic report identifier and a change description for a network parameter change influenced by the analytic report.

20 Claims, 7 Drawing Sheets

(51) Int. Cl.
  *H04L 41/50* (2022.01)
  *H04W 72/20* (2023.01)
  *H04L 41/5009* (2022.01)
  *H04W 24/10* (2009.01)
  *H04L 41/0823* (2022.01)
  *H04W 24/08* (2009.01)
  *H04L 43/0817* (2022.01)

(52) U.S. Cl.
  CPC ......... *H04L 41/5032* (2013.01); *H04W 24/10* (2013.01); *H04W 72/20* (2023.01); *H04W 76/25* (2018.02); *H04L 43/0817* (2013.01); *H04W 24/08* (2013.01)

(58) Field of Classification Search
  CPC ............. H04L 41/0823; H04L 41/5025; H04L 43/065; H04W 28/12; H04W 72/20; H04W 76/25; H04W 24/10
  See application file for complete search history.

(56) References Cited

U.S. PATENT DOCUMENTS

| | | | |
|---|---|---|---|
| 2019/0222489 A1* | 7/2019 | Shan | H04M 15/8022 |
| 2019/0394655 A1* | 12/2019 | Rahman | H04L 41/5058 |
| 2020/0196155 A1* | 6/2020 | Bogineni | H04L 41/12 |
| 2020/0228420 A1* | 7/2020 | Dao | H04L 41/5032 |
| 2020/0329455 A1* | 10/2020 | Ryu | H04W 76/27 |
| 2020/0358670 A1* | 11/2020 | Lee | H04L 43/028 |
| 2021/0168651 A1* | 6/2021 | Marquezan | H04W 24/02 |

OTHER PUBLICATIONS

3GPP TS 23.502 V15.5.1 (Apr. 2019), Technical Specification, 3rd Generation Partnership Project; Technical Specification Group Services and System Aspects; Procedures for the 5G System; Stage 2 (Release 15), pp. 1-354. (Year: 2019).*

* cited by examiner

SYSTEM AND METHOD OF CLOSED LOOP ANALYTICS FOR NETWORK AUTOMATION

BACKGROUND INFORMATION

In order to satisfy the needs and demands of users of mobile communication devices, providers of wireless communication services continue to improve and expand available services as well as networks used to deliver such services. One aspect of such improvements includes the development of core networks as well as options to utilize such core networks. For example, core networks may include a Network Data Analytics Function (NWDAF) that collects data from other network functions, application functions, and operations, administration, and maintenance (OAM) functions.

DETAILED DESCRIPTION OF PREFERRED EMBODIMENTS

Figure 1:
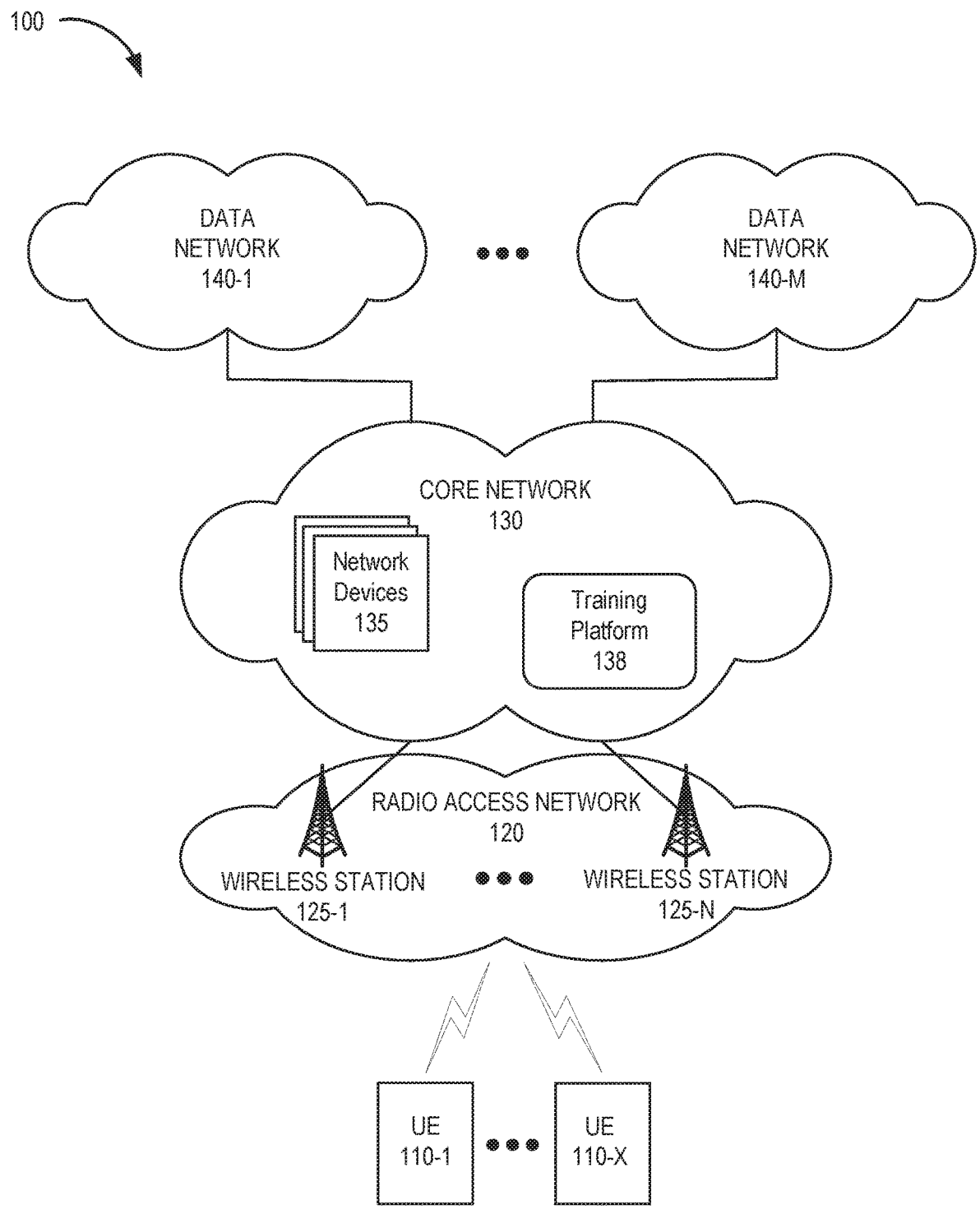
FIG. 1 is a diagram illustrating an environment according to an implementation described herein.

The following detailed description refers to the accompanying drawings. The same reference numbers in different drawings identify the same or similar elements.

Improvements in the core networks of 5G wireless access networks provide new functionality, such as, for example, network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources, may be configured to implement a different set of requirements and/or priorities, and/or may be associated with a particular Quality of Service (QoS) class, type of service, and/or particular enterprise customer associated with a set of UE devices. In order to implement functionality such as network slicing, a 5G core network may include various network nodes, known as network functions (NFs).

A Network Data Analytics Function (NWDAF) is an operator-managed network analytics logical function defined for 5G networks. The NWDAF is responsible for providing network analysis information in response to requests from network functions. For example, a network function (referred to herein as a "commissioning NF") may request specific analysis information on the load level of a particular network slice. Alternatively, the commissioning NF can use a subscription service for automatic notifications from the NWDAF if the load level of a network slice changes or reaches a specific threshold.

When NWDAF provides analytics information responsive to a request from a network function, the response may typically include: (a) Notification Correlation Information provided in the subscription request, (b) analytics identifiers, (c) a related list of analytics on the requested observation period, and (d) optional information. The optional information may include a timestamp of the analytics generation, which allows the commissioning NF to decide if the received information should be used. For instance, a commissioning NF can deem a received notification from NWDAF for a given feedback as invalid or expired based on the timestamp. The optional information may also include a validity period (e.g., defining the time period for which the analytics information is valid) and a probability assertion (e.g., providing a degree of confidence in any statistics/prediction).

NWDAF may collect data from other network functions, as well as application functions and OAM functions (referred to herein collectively as network functions). When a network function provides data to the NWDAF, the data may include an event identifier, a target of event reporting (e.g., a UE or group of UEs), event filter information (e.g., thresholds that trigger reporting), a Notification Target Address and a Notification Correlation ID, the event reporting information, an expiry time and other information.

The current data collection and analytics mechanisms lack facilities for a network function to communicate back to the NWDAF regarding whether previously published analytics information was used and/or the extent to which such analytics information was used. This prevents the NWDAF from correlating and determining if previously provided analytics information was useful and/or to what extent the analytics information was useful. Thus, there is potentially a significant gap in the NWDAF's learning.

Systems and methods described herein implement closed loop analytics feedback for a transport network. More particularly, implementations described herein relate to extensions to 5G NWDAF and NF functionality that provide a feedback loop to promote machine learning by the NWDAF. A network device, such as a NWDAF, receives, from a commissioning NF, an analytic information request for analytic event information and sends, to the commissioning NF, an analytic report that is responsive to the analytic information request wherein the analytic report includes a unique analytic report identifier. The network device receives, from the commissioning NF, a feedback event message that includes the analytic report identifier and a change description for a network parameter change influenced by the analytic report.

Systems and methods described herein may enable the NWDAF to learn the effectiveness of analytics information that it provides to consumers. The systems and methods provide efficient data search, aggregation, and utilization based on tagging of relevant data with correlation identifiers, described further herein as analytics report identifiers. The improved information may provide for more effective network automation.

FIG. 1 is a diagram of an exemplary environment 100 in which the systems and/or methods, described herein, may be implemented. As shown in FIG. 1, environment 100 may include user equipment (UE) devices 110-A to 110-X (referred to herein collectively as "UE devices 110" and individually as "UE device 110"), a radio access network 120, a core network 130, and data networks 140-1 to 140-M. Radio access network 120, core network 130, and data network 140 may be collectively referred to as a transport network.

UE device 110 may include any device with long-range (e.g., cellular or mobile wireless network) wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications. In some implementations, UE device 110 may communicate using machine-to-machine (M2M) communication, such as machine-type communication (MTC), and/or another type of M2M communication.

Radio access network 120 may enable UE devices 110 to connect to core network 130 for mobile telephone service, Short Message Service (SMS) message service, Multimedia Message Service (MMS) message service, Internet access, cloud computing, and/or other types of data services. Radio access network 120 may include wireless stations 125-1 to 125-N (referred to herein collectively as "wireless stations 125" and individually as "wireless station 125"). Each wireless station 125 may service a set of UE devices 110. For example, wireless station 125-1 may service some UE devices 110 when the UE devices 110 are located within the geographic area serviced by wireless station 125-1, while other UE devices 110 may be serviced by another wireless station 125 when the UE devices 110 are located within the geographic area serviced by the other wireless station.

Wireless station 125 may include a 5G base station (e.g., a gNB) that includes one or more radio frequency (RF) transceivers (also referred to as "cells" and/or "base station sectors") facing particular directions. For example, wireless station 125 may include three RF transceivers and each RF transceiver may service a 120 sector of a 360 field of view. Each RF transceiver may include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element. The antenna array may serve k UE devices 110, and may simultaneously generate up to k antenna beams. A particular antenna beam may service multiple UE devices 110. In some implementations, wireless station 125 may also include a 4G base station (e.g., an eNodeB). Furthermore, in some implementations, wireless station 125 may include a mobile edge computing (MEC) system that perform cloud computing and/or network processing services for UE devices 110.

Core network 130 may manage communication sessions for UE devices 110. For example, core network 130 may establish an Internet Protocol (IP) connection between UE device 110 and a particular data network 140. Furthermore, core network 130 may enable UE device 110 to communicate with an application server, and/or another type of device, located in a particular data network 140 using a communication method that does not require the establishment of an IP connection between UE device 110 and data network 140, such as, for example, Data over Non-Access Stratum (DoNAS). Core network 130 may include various types of network devices 135, which may implement different network functions described further herein.

In some implementations, core network 130 may include a Long Term Evolution (LTE) access network (e.g., an evolved packet core (EPC) network). In other implementations, core network 130 may include a Code Division Multiple Access (CDMA) access network. For example, the CDMA access network may include a CDMA enhanced High Rate Packet Data (eHRPD) network (which may provide access to an LTE access network). Furthermore, core network 130 may include an LTE Advanced (LTE-A) access network and/or a 5G core network or other advanced network that includes functionality such as management of 5G NR base stations; carrier aggregation; advanced or massive multiple-input and multiple-output (MIMO) configurations; cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

As described further herein, core network 130 may also include a training platform 138. Training platform 138 may store training data and apply machine learning to develop models used by, for example, NWDAF 268 to implement closed loop analytics feedback for the transport network.

Data networks 140-1 to 140-M (referred to herein collectively as "data networks 140" and individually as "data network 140") may each include a packet data network. A particular data network 140 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of a particular data network 140 may be managed by a communication services provider that also manages core network 130, radio access network 120, and/or particular UE devices 110. For example, in some implementations, a particular data network 140 may include an IP Multimedia Sub-system (IMS) network (not shown in FIG. 1). An IMS network may include a network for delivering IP multimedia services and may provide media flows between two different UE devices 110, and/or between a particular UE device 110 and external IP networks or external circuit-switched networks (not shown in FIG. 1).

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
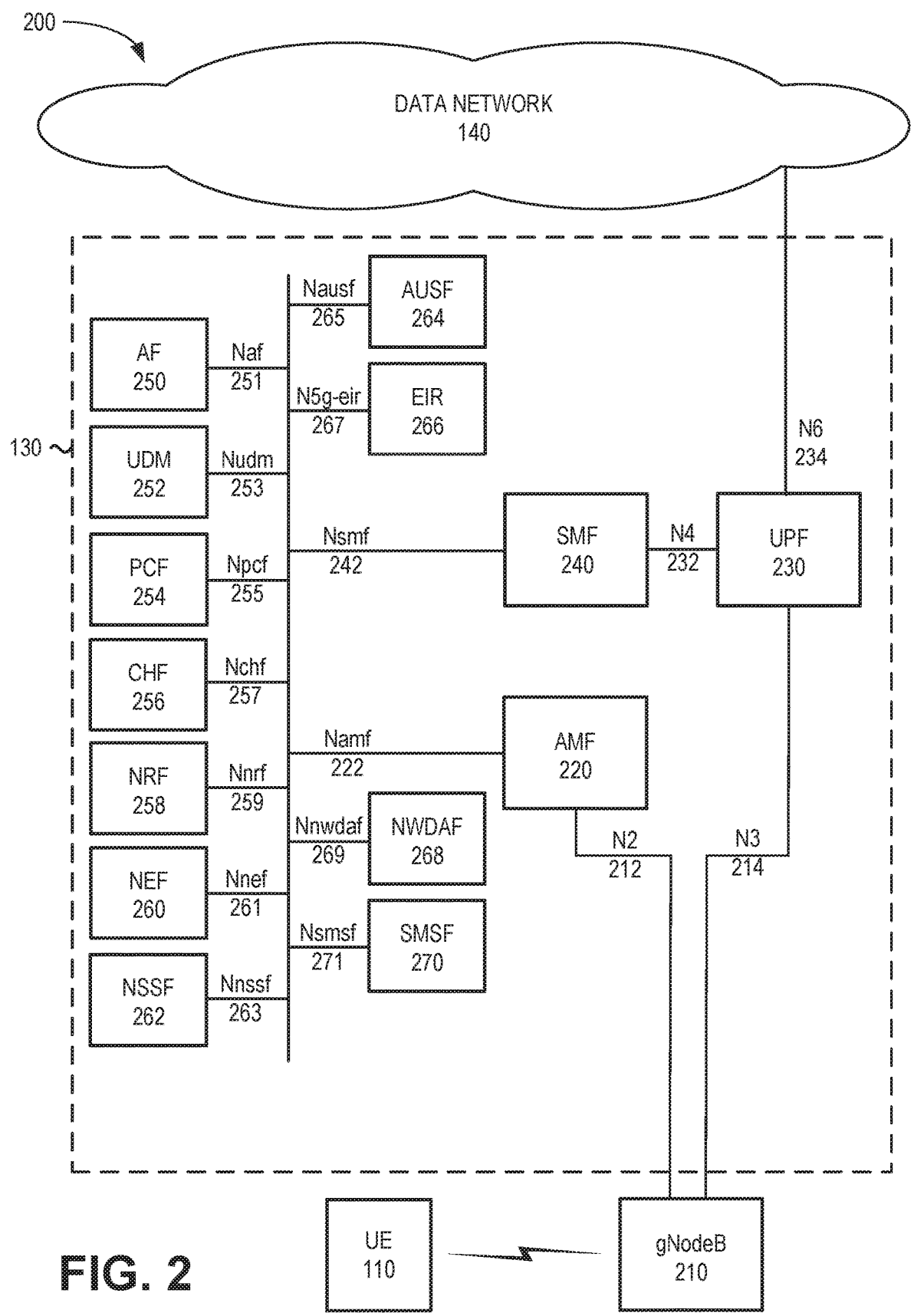
FIG. 2 is a diagram illustrating exemplary components of the core network of FIG. 1 according to an implementation described herein.

FIG. 2 is a diagram illustrating a system 200 that includes exemplary components of core network 130 in the context of environment 100 according to an implementation described herein. As shown in FIG. 2, system 200 may include UE device 110, gNodeB 210, core network 130, and data network 140.

A gNodeB 210 (corresponding to wireless station 125) may include one or more devices (e.g., base stations) and other components and functionality that enable UE device 110 to wirelessly connect to access network 120 using 5G NR Radio Access Technology (RAT). For example, gNodeB 210 may service one or more cells, with each cell being served by a wireless transceiver with an antenna array configured for mm-wave wireless communication. gNodeB 210 may correspond to wireless station 125. gNodeB 210 may communicate with AMF 220 using an N2 interface 212 and communicate with UPF 230 using an N3 interface 214.

Core network 130 may include an Access and Mobility Function (AMF) 220, a User Plane Function (UPF) 230, a Session Management Function (SMF) 240, an Application Function (AF) 250, a Unified Data Management (UDM) 252, a Policy Control Function (PCF) 254, a Charging Function (CHF) 256, a Network Repository Function (NRF) 258, a Network Exposure Function (NEF) 260, a Network Slice Selection Function (NSSF) 262, an Authentication Server Function (AUSF) 264, a 5G Equipment Identity Register (EIR) 266, a NWDAF 268, and a Short Message Service Function (SMSF) 270.

While FIG. 2 depicts a single AMF 220, UPF 230, SMF 240, AF 250, UDM 252, PCF 254, CHF 256, NRF 258, NEF 260, NSSF 262, AUSF 264, EIR 266, NWDAF 268, and SMSF 270, for illustration purposes, in practice, core network 130 may include multiple AMFs 220, UPFs 230, SMFs 240, AFs 250, UDMs 252, PCFs 254, CHFs 256, NRFs 258, NEFs 260, NSSFs 262, AUSFs 264, EIRs 266, NWDAFs 268, and SMSFs 270.

The components depicted in FIG. 2 may be implemented as dedicated hardware components (e.g., network devices 135) or as virtualized functions implemented on top of a common shared physical infrastructure using SDN. For example, an SDN controller may implement one or more of the components of FIG. 2 using an adapter implementing a VNF virtual machine, a CNF container, an event driven serverless architecture interface, and/or another type of SDN architecture. The common shared physical infrastructure may be implemented using one or more devices 300 described below with reference to FIG. 3 in a cloud computing center associated with core network 130.

AMF 220 may perform registration management, connection management, reachability management, mobility management, lawful intercepts, Short Message Service (SMS) transport between UE device 110 and an SMSF 270, session management messages transport between UE device 110 and SMF 240, access authentication and authorization, location services management, functionality to support non-3GPP access networks, and/or other types of management processes. AMF 220 may be accessible by other function nodes via an Namf interface 222.

UPF 230 may maintain an anchor point for intra/inter-RAT mobility, maintain an external Packet Data Unit (PDU) point of interconnect to a particular data network 140, perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a Radio Access Network node (e.g., gNodeB 210), and/or perform other types of user plane processes. UPF 230 may communicate with SMF 240 using an N4 interface 232 and connect to data network 140 using an N6 interface 234.

SMF 240 may perform session establishment, session modification, and/or session release, perform IP address allocation and management, perform Dynamic Host Configuration Protocol (DHCP) functions, perform selection and control of UPF 230, configure traffic steering at UPF 230 to guide the traffic to the correct destinations, terminate interfaces toward PCF 254, perform lawful intercepts, charge data collection, support charging interfaces, control and coordinate of charging data collection, terminate session management parts of NAS messages, perform downlink data notification, manage roaming functionality, and/or perform other types of control plane processes for managing user plane data. SMF 240 may be accessible via an Nsmf interface 242.

AF 250 may provide services associated with a particular application, such as, for example, an application for influencing traffic routing, an application for accessing NEF 260, an application for interacting with a policy framework for policy control, and/or other types of applications. AF 250 may be accessible via an Naf interface 251.

UDM 252 may maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may be accessible via a Nudm interface 253.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 255. CHF 256 may perform charging and/or billing functions for core network 130. CHF 256 may be accessible via Nchf interface 257.

NRF 258 may support a service discovery function and maintain profiles of available network function (NF) devices/instances and their supported services. An NF profile may include an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. Additionally, NRF 258 may include one or more transport network key performance indicators (KPIs) associated with the NF device/instance. NRF 258 may be accessible via an Nnrf interface 259.

NEF 260 may expose capabilities and events to other NFs, including third party NFs, AFs, edge computing NFs, and/or other types of NFs. Furthermore, NEF 258 may secure provisioning of information from external applications to core network 130, translate information between core network 130 and devices/networks external to core network 130, support a Packet Flow Description (PFD) function, and/or perform other types of network exposure functions. NEF 260 may be accessible via Nnef interface 261.

NSSF 262 may select a set of network slice instances to serve a particular UE device 110, determine network slice selection assistance information (NSSAI), determine a particular AMF 220 to serve a particular UE device 110, and/or perform other types of processing associated with network slice selection or management. NSSF 262 may be accessible via Nnssf interface 263.

AUSF 264 may perform authentication. For example, AUSF 264 may implement an Extensible Authentication Protocol (EAP) authentication server and may store authentication keys for UE devices 110. AUSF 264 may be accessible via Nausf interface 265. EIR 266 may authenticate a particular UE device 110 based on UE device identity, such as a Permanent Equipment Identifier (PEI). For example, EIR 266 may check to see if a PEI has been blacklisted. EIR 266 may be accessible via N5g-eir interface 267.

NWDAF 268 may collect analytics information associated with radio access network 120 and/or core network 130. For example, NWDAF 268 may collect accessibility KPIs (e.g., an RRC setup success rate, a RAB success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), service experience KPIs (e.g., mean opinion score (MoS), etc.), and/or other types of transport network KPIs. According to implementations described further herein, NWDAF 268 may generate analytic reports that include unique analytic report identifiers to enable tracking of feedback from commissioning NFs.

SMSF 270 may perform SMS services for UE devices 110. SMSF 270 may be accessible via Nsmsf interface 271. Although FIG. 2 shows exemplary components core network 130, in other implementations, core network 130 may include fewer components, different components, differently arranged components, or additional components than depicted in FIG. 2. Additionally or alternatively, one or more components of core network 130 may perform functions described as being performed by one or more other components of core network 130. For example, core network 130 may include additional function nodes not shown in FIG. 2, such as a Unified Data Repository (UDR), an Unstructured Data Storage Network Function (UDSF), an a Location Management Function (LMF), a Lawful Intercept Function (LIF), a binding session function (BSF), and/or other types of functions. Furthermore, while particular interfaces have been described with respect to particular function nodes in FIG. 2, additionally, or alternatively, core network 130 may include a reference point architecture that includes point-to-point interfaces between particular function nodes.

Figure 3:
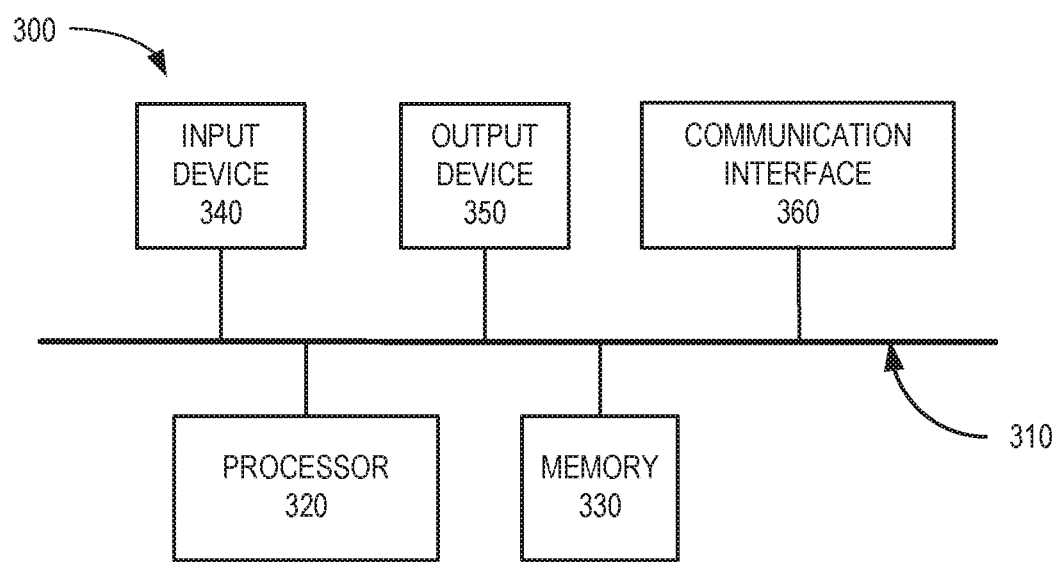
FIG. 3 is a diagram illustrating exemplary components of a device that may be included in a component of FIG. 1 or FIG. 2 according to an implementation described herein.

FIG. 3 is a diagram illustrating example components of a device 300 according to an implementation described herein. UE device 110, gNodeB 210, AMF 220, UPF 230, SMF 240, AF 250, UDM 252, PCF 254, CHF 256, NRF 258, NEF 260, NSSF 262, AUSF 264, EIR 266, NWDAF 268, SMSF 270, and/or other components of core network 130, may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to implementing closed loop analytics feedback for a transport network. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
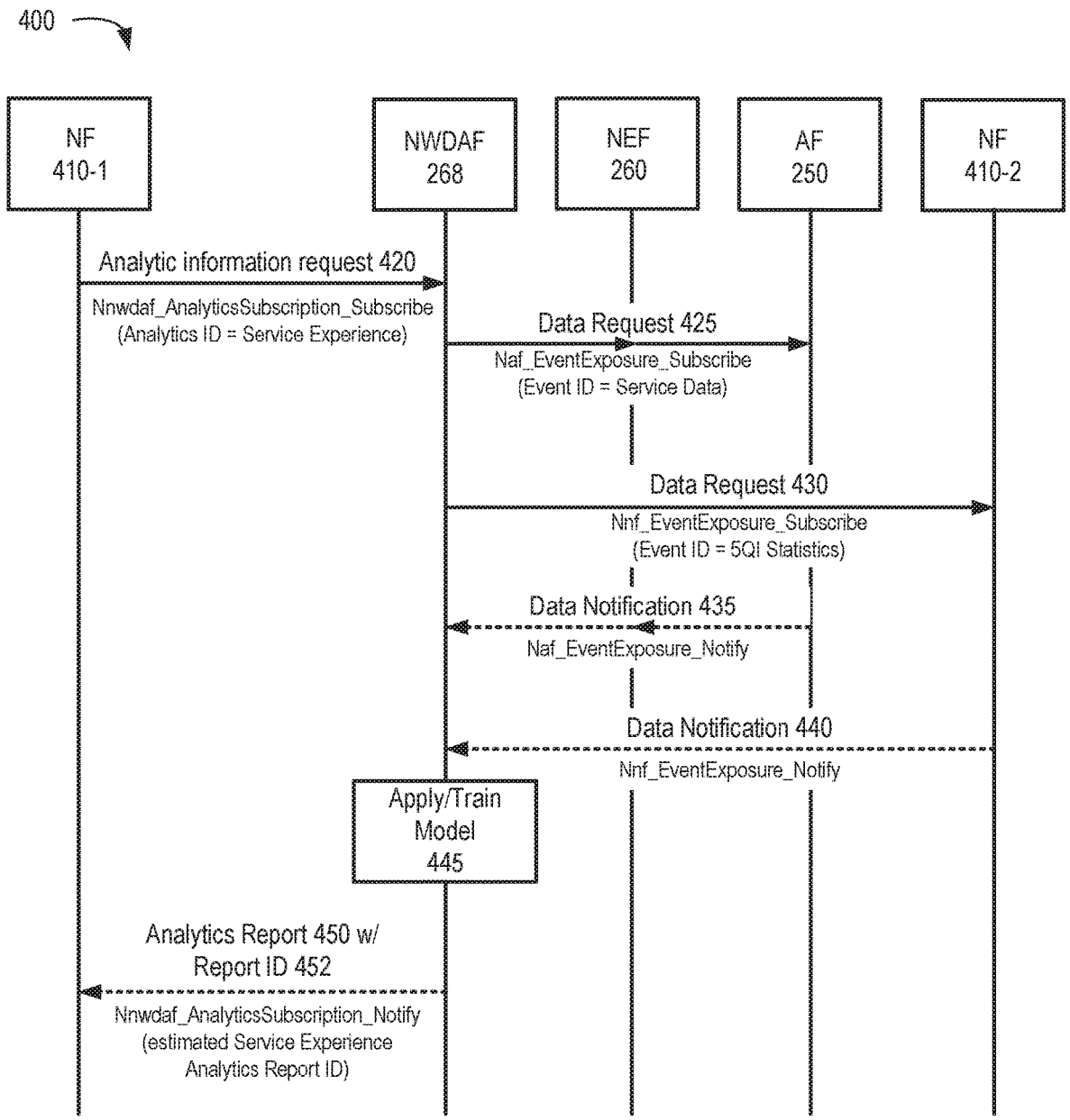
FIG. 4 is a signal flow diagram illustrating exemplary communications to assign an analytics report identifier.

FIG. 4 is a signal flow diagram illustrating exemplary communications in a portion 400 of network environment 100 to assign an analytics report identifier. As shown in FIG. 4, network portion 400 may include AF 250, NEF 260, NWDAF 268, a commissioning network function (NF) 410-1, and a data provider NF 410-2. NFs 410 may correspond to one or more network devices 135. Communications in FIG. 4 reflect a subscription-based notification model for assigning an analytics report identifier. Communications shown in FIG. 4 provide simplified illustrations of communications in network portion 400 and are not intended to reflect every signal or communication exchanged between devices/functions. For example, communications described in FIG. 4 may be implemented via a subscription-notification model or a request-response model.

As shown in FIG. 4, commissioning NF 410-1 (also referred to as a NF service consumer) may subscribe to an analytics service from NWDAF 268. Commissioning NF 410-1 may send an analytic information request 420 (e.g., a Nnwdaf_AnalyticsSubscription_Subscribe message) to NWDAF 268. Analytic information request 420 may include an analytics identifier for a particular service. In the example of FIG. 4, commissioning NF 410-1 may correspond to a PCF (e.g., PCF 254) and the analytics identifier may correspond to a service experience. In other implementations, commissioning NF 410-1 may correspond to a NSSF (e.g., NSSF 262), SMF (240), or another network function, and analytic information request 420 may include an analytics identifier for a different service. For example, in other implementations, analytic information request 420 may request a load level of a network slice instance, a service experience for an application, NF load analytics information for a specific NF 410, network load performance in an area of interest, expected behavior information for a group of UE devices 110 or a specific UE device 110, abnormal behavior information for a group of UE devices 110 or a specific UE device 110, mobility related information for a group of UE devices 110 or a specific UE device 110, or congestion information of user data in a particular location.

NWDAF 268 may receive analytic information request 420 and, in response, may set up subscriptions to collect network data that supports the analytics service requested by commissioning NF 410-1. For example, NWDAF 268 may send a data request 425 (e.g., a Naf_EventExposure_Subscribe message) via NEF 260 to AF 250 to subscribe to service data from one or more AFs 260. Similarly, NWDAF 268 may send a data request 430 (e.g., a Nnf_EventExposure_Subscribe message) to data provider NF 410-2 to subscribe to receive 5G QoS identifier (5QI) statistics from one or more data provider NFs 410-2.

In response to data request 425, AF 250 may provide network data to NWDAF 268 when certain conditions are met (e.g., when a particular network event occurs, a particular data threshold is reached, etc.). For example, AF 250 may send a data notification 435 (e.g., a Naf_EventExposure_Notify message) to NWDAF 268 (e.g., via NEF 260) when the requested event data is generated. In response to data request 430, data provider NF 410-2 may provide network data to NWDAF 268 when certain conditions are met (e.g., when a particular network QoS data is generated, etc.). For example, data provider NF 410-2 may send a data notification 440 (e.g., a Nnf_EventExposure_Notify message) to NWDAF 268 when the requested 5QI data is generated.

NWDAF 268 may receive data notifications 435/440 and may apply, train, and/or update an analytics model 445 that reflects a result/indicator for the requested analytics service (e.g., as requested, for example, by analytic information request 420). For example, NWDAF 268 may train a service quality of experience (QoE) model relevant to commissioning NF 410-1 (e.g., associated with users and/or application services associated with commissioning NF 410-1).

NWDAF 268 may provide an analytics report 450, based on the training model (from step 445), to commissioning NF 410-1. For example, NWDAF 268 may provide an estimated service experience (which may be a range of QoE values) to commissioning NF 410-1 using a Nnwdaf_AnalyticsSubscription_Notify message for analytics report 450. The Nnwdaf_AnalyticsSubscription_Notify message may indicate, for example, how well QoS parameters used by/for commissioning NF 410-1 satisfy a service level (e.g., a service MoS agreed between a mobile network operator (MNO) and the end user or between the MNO and an external application service provider). In other implementations, analytics report 450 may include other information responsive to analytic information request 420 described above.

Commissioning NF 410-1 may determine, based on analytics report 450, whether a particular segment of the transport network is performing optimally. For example, commissioning NF 410-1 may determine whether a service level agreement (SLA) or other performance metric is being satisfied. For example, if commissioning NF 410-1 is a PCF (e.g., PCF 254) and determines that an application SLA is not satisfied, commissioning NF 410-1 may take into account the Observed Service Experience and the operator policies including SLA and required Service Experience (which can be a range of values) to determine updated QoS parameters to be applied for the service.

According to implementations described herein, analytics report 450 may include, among other information, an analytics report identifier 452. Analytics report identifier 452 may be a unique identifier (e.g., an alpha-numeric value unique within NWDAF messaging) that may be used by NFs 410 and NWDAF 268 to correlate changes (e.g., policy changes that commissioning NF 410-1 implements in response to NWDAF analytics) with particular analytics reports from NWDAF 268. According to one implementation, analytics report identifier 452 may be generated and assigned by NWDAF 268.

Figure 5A:
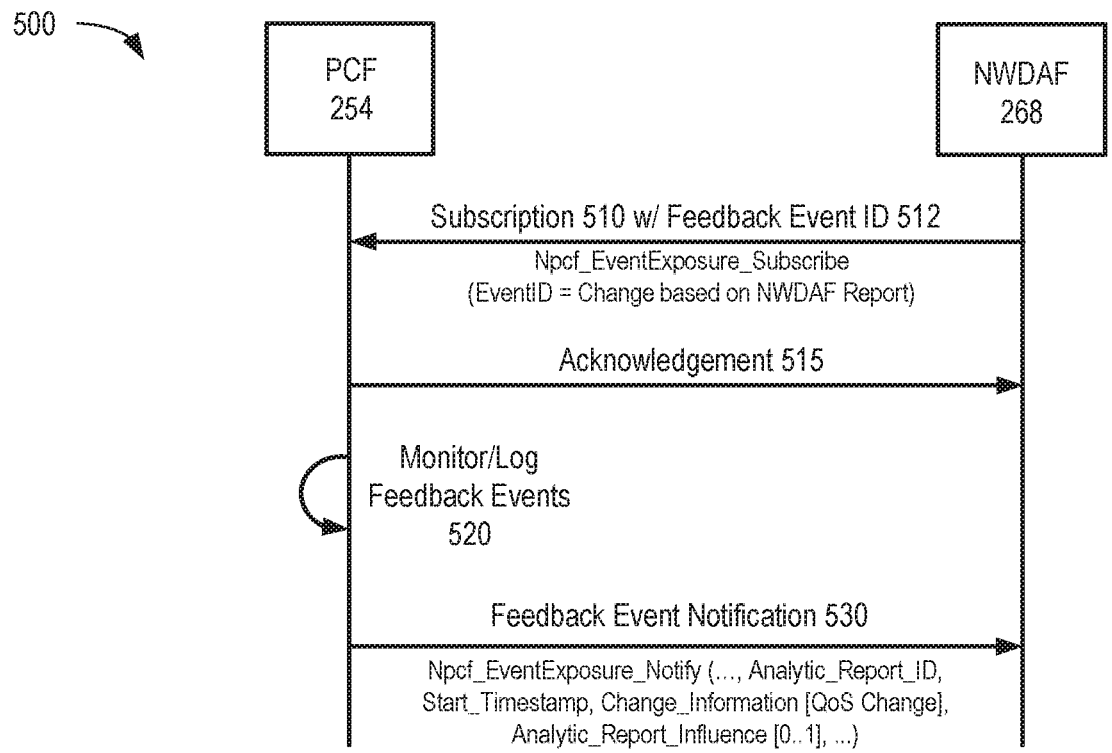
FIG. 5A is a signal flow diagram illustrating exemplary communications for indicating a network function parameter change associated with an analytics report identifier.

FIG. 5A is a signal flow diagram illustrating exemplary communications in a portion 500 of network environment 100 for indicating a network function parameter change associated with an analytics report identifier. As shown in FIG. 5A, network portion 500 may include PCF 254 and NWDAF 268. PCF 254 may correspond to commissioning NF 410-1 of FIG. 4. Communications in FIG. 5A describe how a NF may use an analytics report identifier to communicate back to a NWDAF about whether previously published analytics information was utilized and the extent to which such analytics information was utilized. Communications shown in FIG. 5 provide simplified illustrations of communications in network portion 500 and are not intended to reflect every signal or communication exchanged between devices/functions.

According to one implementation, NWDAF 268 may expressly subscribe to receive feedback notifications from a specific NF. Accordingly, as shown in FIG. 5A, NWDAF 268 may send a subscription request 510 (e.g., Npcf_EventExposure_Subscribe) to PCF 254. Exposure subscription request 510 may include a feedback event identifier (e.g., "EventID") 512 directing PCF 254 to report a change that is invoked based on analytics reports from NWDAF 268. In one implementation, subscription request 510 may include one or more analytic report IDs. In other implementations, subscription request 510 may apply to all analytic reports. Event identifier 512 may be a dedicated event identifier for notifying of a change based on the analytic report. Event identifier 512 may be a standardized value applicable for any commissioning NF 410-1. In another implementation, event identifier 512 may be applicable to a particular type of NF (e.g., a PCF, AF, etc.) or report.

PCF 254 may provide a subscription acknowledgement 515 in response to exposure subscription request 510, and may monitor 520 for any changes (e.g., parameter changes, policy changes, etc.) that PCF 254 initiates. Assume, for example, that PCF 254 (e.g., a commissioning NF 410-1) receives an analytics report (e.g., analytics report 450) including analytics report identifier 452. PCF 254 may determine, based on the analytics report, that a QoS parameter change is required and initiate a parameter change (e.g., a policy change) for core network 130. Once the parameter change is initiated, PCF 254 may send an express feedback event notification 530 to NWDAF 268 including analytics report identifier 452, action(s) taken, and an extent to which the NWDAF analytic was considered. For example, PCF 254 may send feedback event notification 530 as an Npcf_EventExposure_Notify message. Feedback event notification 530 may be sent to NWDAF 268 independently, or feedback event notification 530 may be piggybacked on top of another notification or message.

Figure 5B:
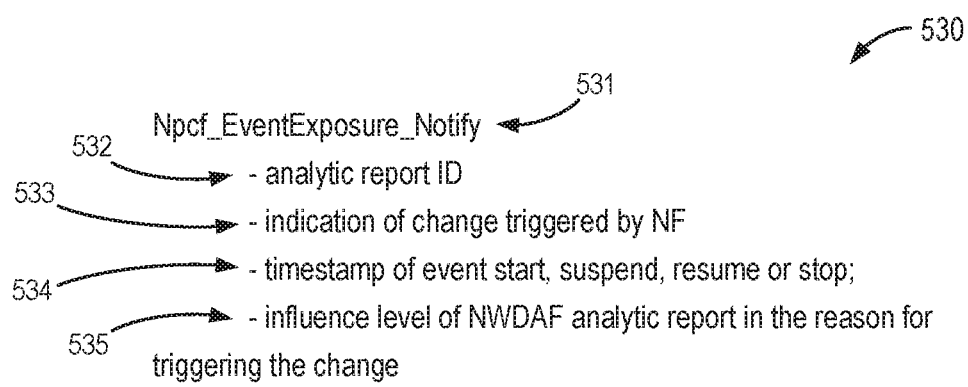
FIG. 5B is a diagram illustrating exemplary information in a feedback event notification.

FIG. 5B is an example of information that may be included in feedback event notification 530. As shown in FIG. 5B, feedback event notification 530 may include a message type 531, a report identifier ID field 532, a change indicator field 533, a time field 534, and an influence level field 535.

Message type 531 may include an event type or name for feedback event notification 530. Message type 531 may indicate the type of sending NF or interface and identification as a feedback message (e.g. "Npcf_EventExposure_Notify"). Report identifier ID field 532 may identify the analytics report 450 to which feedback event notification 530 relates. The value in report identifier ID field 532 may correspond, for example, to analytics report identifier 452.

Change indicator field 533 may include indication of a change that was introduced in the network (e.g., core network 130) due to analytics report 450. Entries for change indicator field 533 may include a specific parameter change (e.g., a QoS parameter), such as a before and after value, or another indication of a change triggered by commissioning NF 410-1.

Timestamp field 534 may include, for example, a timestamp of the event start, suspend, resume or stop. Influence level field 535 may include an influence level of the NWDAF analytic report (e.g. analytics report 450) in the reason for triggering the change in the event sent by the commissioning NF to NWDAF 268. The influence level may include, for example, a value between 0 and 1.

Although FIG. 5B provides an example of information that may be included in feedback event notification 530, in other implementations, feedback event notification 530 may include different, differently arranged, or additional information.

Figure 6:
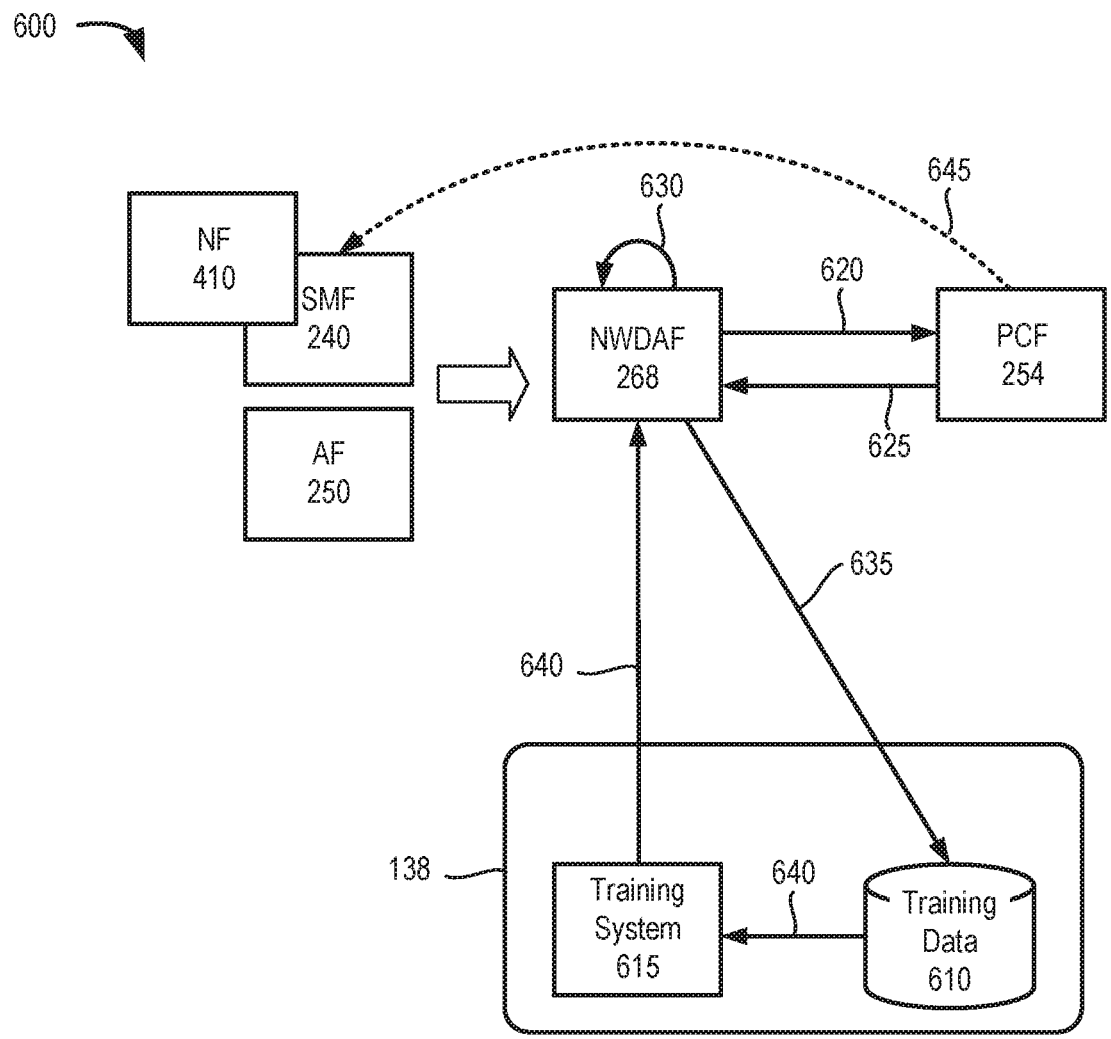
FIG. 6 is a block diagram illustrating communications to apply a network function change in a portion of network environment of FIG. 1.

FIG. 6 is a block diagram illustrating exemplary communications in a portion 600 of network environment 100 using feedback notification 530. As shown in FIG. 6, network portion 600 may include training platform 138, AF 250, PCF 254, NWDAF 268, and other network functions 410. As shown in FIG. 6, training platform 138 may include training data storage 610 and a training system 615.

After receiving feedback event notification 530, NWDAF 268 may continue to collect information to measure, for example, Service Experience. According to implementations described herein, with the feedback introduced by feedback event notification 530, NWDAF 268 may become aware of a change that was introduced in the network (e.g., core network 130) because of analytics report 450 and if such a change helped in achieving a desired Service Experience. Based on this analysis of feedback event notification 530, when NWDAF 268 provides a subsequent report, NWDAF 268 can appropriately indicate a confidence factor. FIG. 6 demonstrates this usage of feedback information provided by PCF 254 to NWDAF 268 for reinforced learning and for effective decision making.

At step 620, NWDAF 268 may subscribe to changes based on NWDAF report events (e.g., corresponding to exposure subscription request 510 with event ID 512). At some later time, in step 625, PCF 254 may report an event (e.g., corresponding to feedback event notification 530). In the example of FIG. 6, assume the exposure subscription request 510 and corresponding to feedback event notification 530 are for a QoS change driven to improve a service experience.

In step 630, NWDAF 268 may monitor the analytics or the flow for which the QoS change was made. For example, NWDAF 268 may apply the timestamp and QoS change information reported by PCF 254 in feedback event notification 530. NWDAF 268 may, for example, derive the casual impact of the change on the flows, isolating the influence of current action from an overall network environment change.

In step 635, NWDAF 268 may generate training data instances based on the analysis of step 630. In one implementation, each training data instance may be compiled in the form of a tuple including, for example, a current state, an action, and a reward. The current state may captures a MoS score, QoS parameter set, and network load conditions. The action may capture a QoS parameter change, and the reward may capture a change in MoS score (or another KPI). The reward function may be automatically calculated by NWDAF 268 looking at the analytics for the traffic flows after the corrective action. Since NWDAF 268 has the context of the performance of rest of the flows within a cell/SMF/UPF for a reported event, NWDAF 268 can attribute the improvement in the MoS (or another KPI) to the specific analytics-based corrective action in contrast with general network condition changes. In one implementation, only the improvement due to a specific analytics-based action is considered in the reward function.

Still referring to FIG. 6, the training data instances may be stored offline in training data store 610. The training data generated by NWDAF 268 and stored in training data store 610 may be used offline by training system 615 for reinforcement model training using the tuple data (e.g., state, action, reward) to generate, tune, and validate updated models. In step 640, updated models may be forwarded to NWDAF 268 and included for subsequent analysis (e.g., model training 445) on the impact of future network changes.

As described above, the above feedback and closed loop functioning may facilitate reinforced machine learning in NWDAF 268. The action and feedback provide training data for an autonomous agent in NWDAF 268, to build a simulation environment to train, test and compare models (e.g., a model tuning process). The autonomous agent may be described as the module within NWDAF 268 that is providing the specific insights (analytics report 450) to PCF 254 and other NFs 410.

According to anther implementation, the operation of the autonomous agent can be guided by the feedback. For example, if NWDAF 268 knows that there is high level of uncertainty or only a minor improvement, the autonomous agent may be configured to behave accordingly (e.g., avoid sending analytics report 450 or include a low-confidence level indication in analytics report 450).

According to still another implementation, any commissioning NF 410 (e.g., PCF 254 in the example of FIG. 6) can also propagate an analytics report identifier (e.g., analytics report ID 452) based on which a change was made to other network functions 410, such as SMF 240. As shown in step 645 of FIG. 6, PCF 254 may include analytics report ID 452 in a message to initiate a QoS parameter change or another message. Thus, in this example, SMF 240 (or another NF 410) could also include analytics report ID 452 in events reported to NWDAF 268.

Figure 7:
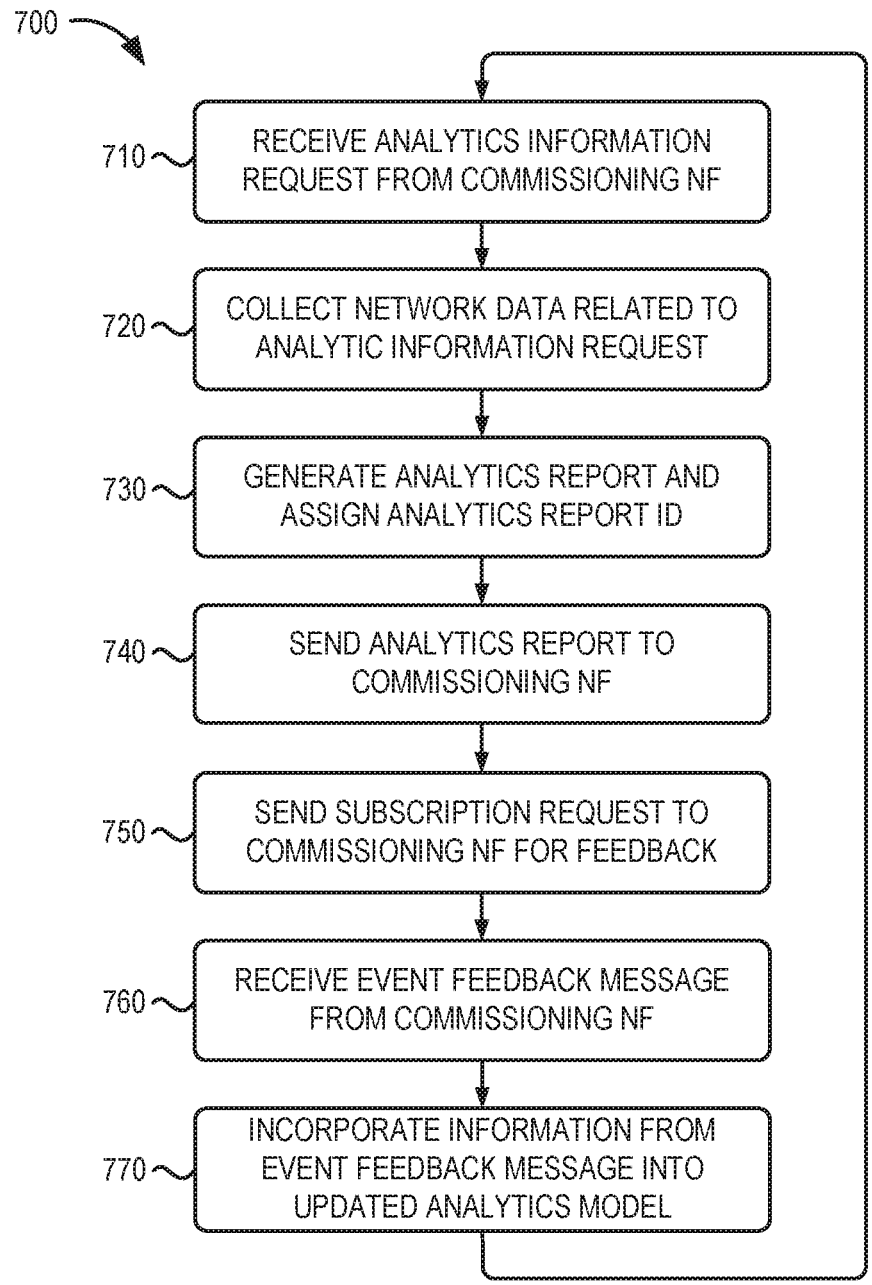
FIG. 7 is a flow diagram illustrating an exemplary process for implementing closed loop analytics feedback for a transport network, according to an implementation described herein.

FIG. 7 is a flow diagram illustrating an exemplary process 700 for implementing closed loop analytics feedback for a transport network, according to an implementation described herein. In one implementation, process 700 may be implemented by NWDAF 268. In another implementation, process 700 may be implemented by NWDAF 268 in conjunction with one or more other network devices in network environment 100.

Referring to FIG. 7, process 700 may include receiving, an analytic information request from a commissioning network function (block 710), and collecting network data related to the analytic information request (block 720). For example, as describe above in connection with FIG. 4, commissioning NF 410-1 may provide an analytic information request 420 to NWDAF 268, such as a subscription or request, for an analytics event (e.g., service experience, expected behavior information, mobility related information, congestion information, etc.). In response, NWDAF 268 may collect network data (e.g., from AF 250 and other NFs 410) that supports the analytics service requested by commissioning NF 410-1. In another implementation, NWDAF 268 may subscribe to collection of analytics data (e.g., from AF 250 and other NFs 410) to support analytic information request 420.

Process 700 may further include generating an analytic report with an analytic report identifier (block 730), and sending the analytic report to a commissioning network function (block 740). For example, NWDAF 268 may apply the collected network data to a training model (e.g., service QoE model 445) to generate analytic information responsive to the analytic information request. NWDAF 268 may generate an analytics report and assign a unique analytics report ID (e.g., analytics report ID 452). NWDAF 268 may send the analytics report with the unique analytics report ID to commissioning NF 410-1.

Process 700 may also include sending a subscription request to the commissioning network function for feedback (block 750) and receiving event feedback message from the commissioning network function (block 760). For example, NWDAF 268 may send a subscription request 510 (to PCF 254 include an event identifier 512 that directs PCF 254 to report changes that are invoked based on analytics reports from NWDAF 268. In response, PCF 254 may monitor for feedback events and send a feedback event notification 530 to NWDAF 268 as an independent message or piggybacked on top of another notification or message.

Process 700 may additionally include incorporating information from the event feedback message into an updated analytics model (block 770). For example, NWDAF 268 may generate training data instances from feedback event notifications 530. The training data generated by NWDAF 268 and stored in training data store 610 may be used offline by training system 615 for reinforcement model training to generate, tune, and validate updated models. The updated models may be forwarded to a production environment of NWDAF 268 and used for subsequent analysis on the impact of future network changes.

Systems and methods described herein enable an NWDAF to learn the effectiveness of analytics information that it provides to its consumers (e.g., commissioning NFs). The system and methods enable efficient data search, aggregation, and utilization based on tagging of relevant data with correlation identifiers (e.g., analytics report IDs). The systems and methods also enable more effective network automation.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, while examples described herein have been primarily described in the context of and exchange between a PCF and a NWDAF, other use cases and interactions between various NFs and a NWDAF my use the feedback/closed loop approach identified herein. Thus, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 320, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 320) of a device. A non-transitory storage medium includes one or more of the storage mediums described in relation to memory 330.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a Network Data Analytics Function (NWDAF) device and from a commissioning network function, an analytic information request for analytic event information;
   generating, by the NWDAF device, an analytic report that is responsive to the analytic information request;
   generating, by the NWDAF, a unique analytic report identifier for the analytic report;
   sending, by the NWDAF device and to the commissioning network function, the analytic report with the unique analytic report identifier; and
   receiving, by the NWDAF device and after the sending, a feedback event message from the commissioning network function, wherein the feedback event message includes:
   the unique analytic report identifier,
   a change description for a policy change implemented by the commissioning network function in response to the analytic report, and
   a quantitative influence level value of the analytic report in relation to the commissioning network function triggering the policy change.

2. The method of claim 1, further comprising:
   applying, by the NWDAF device, the change description to generate an updated analytics model related to the analytic report; and
   applying the updated analytics model to another analytic report, wherein the another analytic report includes a confidence factor based on the feedback event message.

3. The method of claim 1, further comprising:
   sending, by the NWDAF device and to the commissioning network function, a subscription request for a feedback event that triggers the feedback event message.

4. The method of claim 3, wherein the subscription request includes a dedicated event identifier for notifying of a change based on the analytic report.

5. The method of claim 1, wherein the feedback event message further includes a timestamp related to the policy change.

6. The method of claim 1, further comprising:
monitoring, by the NWDAF device, a flow associated with the feedback event message, and
deriving, by the NWDAF device, a casual impact of the policy change on the flow.

7. The method of claim 1, further comprising:
collecting, based on the analytic information request, network data related to the analytic information request; and
applying the collected network data to an analytics model for the requested analytic event information.

8. The method of claim 1, wherein the commissioning network function includes a Policy Control Function (PCF) device, a Session Management Function (SMF) device, or a Network Slice Selection Function (NSSF) device.

9. The method of claim 1, further comprising:
applying, by the NWDAF device, the change description to generate an updated analytics model related to the analytic report; and
applying the updated analytics model to another analytic report.

10. The method of claim 1, wherein the NWDAF device is in a core network.

11. The method of claim 1, further comprising:
receiving, from another network function, an event report based on the policy change in response to the analytic report, wherein the event report includes the analytic report identifier.

12. A Network Data Analytics Function (NWDAF) device, comprising:
a memory storing instructions; and
a processor configured to execute the instructions to:
receive, from a commissioning network function, an analytic information request for analytic event information;
generate an analytic report that is responsive to the analytic information request;
generate a unique analytic report identifier for the analytic report;
send, to the commissioning network function, the analytic report with the unique analytic report identifier; and
receive, after the sending and from the commissioning network function, a feedback event message, wherein the feedback event message includes:
the unique analytic report identifier,
a change description for a policy change implemented by the commissioning network function in response to the analytic report, and
a quantitative influence level value of the analytic report in relation to the commissioning network function triggering the policy change.

13. The NWDAF device of claim 12, wherein the processor is further configured to:
apply the change description to generate an updated analytics model related to the analytic report; and
apply the updated analytics model to another analytic report, wherein the another analytic report includes a confidence factor based on the feedback event message.

14. The NWDAF device of claim 12, wherein the processor is further configured to:
send, to the commissioning network function, a subscription request for a feedback event that triggers the feedback event message.

15. The NWDAF device of claim 12, wherein the processor is further configured to:
send, to the commissioning network function, a request for a feedback event that triggers the feedback event message, wherein the request includes a dedicated event identifier for notifying of a change based on the analytic report.

16. The NWDAF device of claim 12, wherein the feedback event message further includes:
a timestamp related to the policy change, and
wherein the quantitative influence level value includes a value between 0 and 1.

17. The NWDAF device of claim 12, wherein the NWDAF device is located within a core network.

18. A non-transitory computer-readable medium containing instructions executable by at least one processor, the computer-readable medium comprising one or more instructions to:
receive, by a Network Data Analytics Function (NWDAF) device and from a commissioning network function, an analytic information request for analytic event information;
generate, by the NWDAF device, an analytic report that is responsive to the analytic information request;
generate, by the NWDAF device, a unique analytic report identifier for the analytic report;
send, by the NWDAF device and to the commissioning network function, the analytic report with the unique analytic report identifier; and
receive, by the NWDAF device and after the sending and from the commissioning network function, a feedback event message, wherein the feedback event message includes:
the unique analytic report identifier,
a change description for a policy change implemented by the commissioning network function in response to the analytic report, and
a quantitative influence level value of the analytic report in relation to the commissioning network function triggering the policy change.

19. The non-transitory computer-readable medium of claim 18, the instructions to generate the analytic report further comprise one or more instructions to:
collect, based on the analytic information request, network data related to the analytic information request; and
apply the collected network data to an analytics model for the requested analytic event information; and
generate, based on the analytics model, the analytic report.

20. The non-transitory computer-readable medium of claim 18, further comprising one or more instructions to:
apply the change description to generate an updated analytics model related to the analytic report; and
apply the updated analytics model to generate another analytic report.

* * * * *